United States Patent [19]
Ban et al.

[11] 4,024,580
[45] May 17, 1977

[54] MAGNETIC SOUND RECORDING AND PLAYING BACK APPARATUS

[76] Inventors: Itsuki Ban, 829, Higashi Ohizumi, Nerima, Tokyo; Kasunori Mochizuki, 6673, Ohaza Hodaka, Hodakamachi, Minamiazumi, Negano, both of Japan

[22] Filed: Aug. 4, 1975

[21] Appl. No.: 601,436

[30] Foreign Application Priority Data
Aug. 2, 1974 Japan .............................. 49-87996
Nov. 15, 1974 Japan ............................ 49-131174

[52] U.S. Cl. .................................. 360/96; 360/105
[51] Int. Cl.² ...................... G11B 5/54; G11B 15/00
[58] Field of Search ............... 360/93, 96, 130, 105

[56] References Cited
UNITED STATES PATENTS

3,882,542   5/1975   Nakamichi .......................... 360/96
3,916,443  10/1975   Bumb, Jr. et al. ................... 360/96

*Primary Examiner*—Vincent P. Canney
*Attorney, Agent, or Firm*—Fleit & Jacobson

[57] ABSTRACT

In magnetic sound recording and reproducing apparatus of the type comprising a cassette holder adapted to recline a cassette containing a magnetic tape, an operating lever carrying a magnetic head and a pinch roller, a capstan, means for driving the capstan, means for moving the operating lever so as to move the magnetic head and the pinch roller toward and away from the magnetic tape and the capstan respectively, and a mode switching mechanism, the mode switching mechanism is provided with driving means for moving the operating lever for selectively performing playing back, rewinding and rapid feeding, and coupling means for operating the operating means from the driving means of the capstan.

21 Claims, 23 Drawing Figures

MAGNETIC SOUND RECORDING AND PLAYING BACK APPARATUS

BACKGROUND OF THE INVENTION

This invention relates to magnetic sound recording and playing back apparatus utilizing a cassette and including means driven by the capstan for moving playing back members such as a magnetic head, pinch roller etc. toward and away from the magnetic tape.

The magnetic head and the pinch roller are urged against the magnetic tape payed out from the cassette and the capstan for playing back the sound recorded on the tape and moved away from the cassette to stop, reproducing, or perform rapid or fast feeding or rewinding. According to a prior art design, a manually operated push button mechanism is used for moving a lever mechanism carrying the playing back members such as the magnetic head and the pinch roller. Such mechanism, however, requires a large operating force and a rigid push button mechanism. If the push button is constructed to have a light weight and simple construction, it could be operated with a small force that is by a soft touch but it would be necessary to operate the mode switching members by some type of power driving means such as an electromagnet which is not only heavy and expensive but produces noise.

SUMMARY OF THE INVENTION

Accordingly, it is an object of this invention to provide magnetic sound recording and playing back apparatus which is not necessary to use any additional power driving means for switching the mode of operation of the apparatus.

Another object of this invention is to provide an improved magnetic sound recording and playing back apparatus capable of switching the mode without producing objectionable noise.

Still another object of this invention is to provide magnetic sound recording and playing back apparatus including a novel mode switching mechanism that can use push buttons of light weight and simple construction and hence can be operated with a small force.

According to this invention, these and other objects can be attained by providing magnetic sound recording and playing back apparatus of the type comprising a cassette holder adapted to receive a cassette containing a magnetic tape, an operating lever carrying a magnetic head and a pinch roller, a capstan, means for driving the capstan, means for moving the operating lever so as to move the magnetic head and the pinch roller toward and away from the magnetic tape and the capstan respectively, and a mode switching mechanism, characterized in that the mode switching mechanism comprises driving means for the operating lever for selectively performing playing back, rewinding, stop and rapid feeding, and coupling means for operating the driving means from the driving means of the capstan.

The driving means and the coupling means of the mode switching mechanism comprises an idle wheel which is normally held out of engagement with the capstan, a reduction gearing for reducing the speed of the idle wheel at a predetermined ratio, means responsive to an electric signal for urging the idle wheel against the capstan thus driving the idle wheel, means for disengaging the idle wheel from the capstan for stopping the idle wheel when it makes one revolution, and a rotary cam driven by the reduction gearing and disposed to drive the operating lever.

BRIEF DESCRIPTION OF THE DRAWINGS

Further objects and advantages of the invention can be more fully understood from the following detailed description taken in conjunction with the accompanying drawings in which:

FIG. 19, 20, and 21 show another modification of the mode switching mechanism in which

DESCRIPTION OF THE PREFERRED EMBODIMENTS

FIGS. 1 to 4 show one example of magnetic sound recording and playing back apparatus to which the novel mode switching mechanism of this invention is applicable. The apparatus shown in these drawings forms the subject matter of a copending application filed concurrently with this application. The apparatus comprises a downwardly inclining chassis 200 contained in the holder, not shown, of the apparatus. The fore end of the chassis is connected to the inner end of the front panel of the casing while the rear or inner and is mounted on a support 202. A cassette holder 203 is pivotably mounted on a pivot pin 204 at its fore end and urged to the left by means of a powerful spring, not shown, as shown by an arrow A. The cassette holder is preferably made of moulded plastic. A capstan 205 is rotatably supported by the chassis 200 and a flywheel 206 and pulleys 207 and 208 are secured on the upper surface of the chassis and adapted to protrude into a cassette 210 contained in the cassette holder 203. A driving motor 211, preferably of the type controlled by an electronic control circuit as will be described later, is mounted on the chassis 200 and arranged to drive the capstan 205 through the pulley 207, and endless belt 212 and a pulley 213 secured to the shaft of the motor.

A pair of reel supporting platforms 214 and 215 are mounted on a subchassis 216 secured to the bottom surface of the chassis 200. Since both reel supporting platforms have the same construction, the construction of one of them, that is 214 will be described in detail with reference to FIGS. 3 and 4. More particularly, the reel supporting platform comprises a shaft 217 secured to the subchassis 216, a reel shaft 218 and an integral cup shaped disc 219 which are loosely mounted on shaft 217, a disc 220 and an integral sleeve 221 which are also loosely mounted on shaft 217 and a friction disc 222 made of felt, for example, and interposed between discs 219 and 220. A spring 223 is provided for resiliently clamping the friction disc 222 between two discs 219 and 220. A pulley 224 is also loosely mounted on the shaft 217 and driven by pulley 208 connected to the capstan 205 through a belt 225. The pulley 224 and the sleeve 221 are coupled together through a one way clutch constructed as follows.

Figure 4:
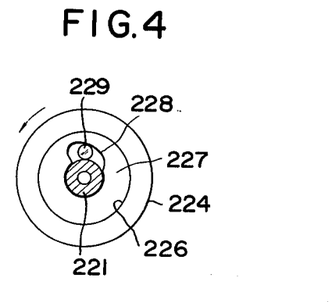
FIG. 4 is a cross-sectional view taken along a line IV—IV in FIG. 3.

As shown in FIG. 4 the pulley 224 is provided with a circular recess 226 for receiving a plate cam 227. The plate cam is provided with a recess 228 to receive a steel ball 229 for causing it to roll along the periphery of sleeve 221 and the inner wall of the recess 228. When the pulley 224 rotates in the counterclockwise direction, the steel ball 229 is jammed between the sleeve 221 and the inner wall of the recess 228, thus transmitting the power to sleeve 221. On the contrary when the pulley 224 is rotated in the clockwise direction the clutch is disengaged. The reel supporting platform 215 has the same construction but its oneway clutch is engaged when its pulley 226 is rotated in the clockwise direction by an endless belt 227 which surrounds pulleys 224 and 226 of the reel supporting platforms 214 and 215 and the pulley 208 connected to the capstan 205. Thus, when the capstan 205 is driven in the counterclockwise direction, as viewed in FIG. 2, for driving the magnetic tape, not shown, pulley 224 is also rotated in the same direction so that reel shaft 218 is driven through the one way clutch to take up the tape. Thus the reel shaft 218 operates as a take up shaft. Although the pulley 226 of the reel supporting platform 215 is also driven in the counterclockwise direction, as its one way clutch is disengaged its reel shaft will not be rotated. The friction coupling provided by the friction disc 222 is designed such that the pulley 224 rotates at a speed of 6 to 10 times of the speed of reel shaft 218. Under these conditions a magnetic head 230 is brought close to the magnetic tape by the mechanism to be described later thereby playing back the sound recorded on the tape. When the rotation of the driving motor 211 is reversed, the capstan 205 and pulleys 224 and 226 are rotated in the clockwise direction. Accordingly, the reel shaft of the reel supporting platform 215 is driven by its one way clutch thus acting as the take up shaft for taking up the magnetic tape. At this time the reel shaft 218 of the reel supporting platform 214 is idle to act as the pay out shaft. When the apparatus is constructed as the so-called dual capstan type an automatic reciprocating playing back system is provided in which the playing back is made on the go and return travels of the magnetic tape. According to this system there are provided means for producing an electric signal when the magnetic tape is stopped after it has been completely wound on either one of the reel shafts, an electromagnetic device energized by the signed for alternately switching two pairs of induction coils cooperating with the upper and lower tracks of the magnetic tape for applying the outputs of the induction coils to preamplifiers, not shown, and means responsive to the electric signal for alternately reversing the direction of rotation of the driving motor 211. With this system when the running of the magnetic tape is completed in which the magnetic head operates to play back the record in the upper track the magnetic head is automatically shifted to the lower track and the motor 211 is reversed for playing back the record in the lower track while the tape is run in the opposite direction.

Figure 1:
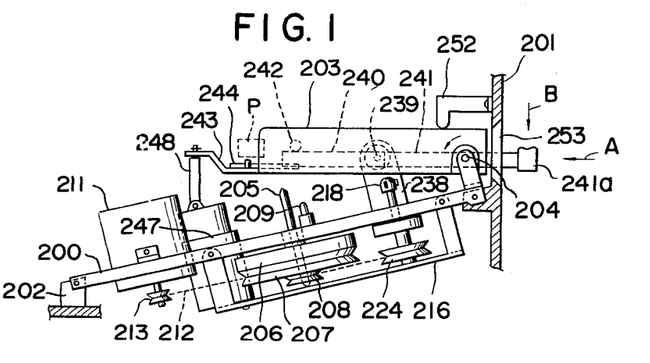
FIG. 1 is a side view of the cassette loading mechanism of magnetic sound recording and playing back apparatus to which the mode switching mechanism embodying the invention is applicable.

As operating lever 231 is mounted on the bottom of the cassette holder 203 to be slidable in the direction of insertion of the cassette by elongated slots 232 and pins 233 secured to the cassette holder. The operating lever 231 is biased to the right as viewed in FIG. 2 by means of a spring 234 for urging a pinch roller 235 against the capstan 205 and the magnetic head 230 against the magnetic tape, not shown. The magnetic head 230 is supported by the operating lever 231 and the pinch roller 235 is rotatably mounted on one end of an arm 236 with the opposite end pivotally connected to the operating lever 231 by a pivot pin 237. The arm 236 is biased in the clockwise direction by means of a spring, not shown. In FIG. 1 the magnetic head and the pinch roller are designated by a block P.

A bearing pedestal 238 is mounted on the chassis 200 on one side of the cassette holder 203 for rotatably supporting a shaft 239. A pair of parallel levers 240 and 241 are connected to the opposite ends of shaft 239. The free end of lever 240 is guided by a pin 242 secured to one side of the cassette casing 203. A projection 243 is secured to the inner end of the cassette casing 203 and one end of an ejection lever 244 is pivotally mounted on the projection 243 by means of a pin 245. The ejection lever 244 is biased by means of a spring, not shown, to rotate in the counterclockwise direction as shown by an arrow C in FIG. 2. Further, the ejection lever engages one side of a stop members 246 secured to the chassis 202. The projection 243 is connected to a damping device shown as an air cylinder 247 through a connecting rod 248, the bottom end of cylinder 247 being secured to the subchassis 216.

Figure 2:
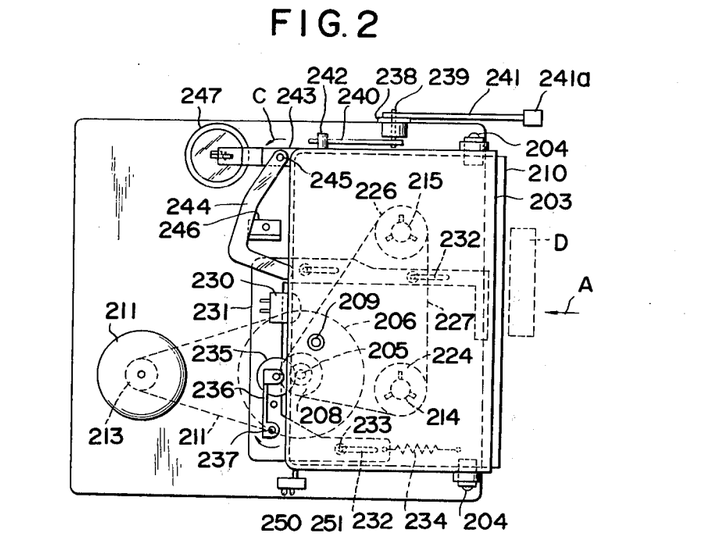
FIG. 2 is a plan view of the cassette loading mechanism shown in FIG. 1.
Figure 3:
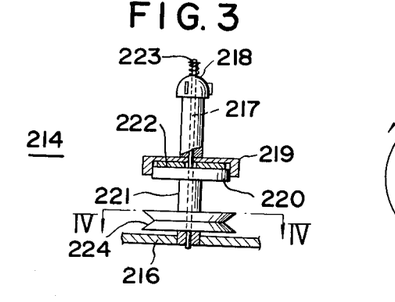
FIG. 3 is a side view, partly in section, of a reel shaft.

When the knob 241a of the lever 241 is depressed down as shown by arrow B shown in FIG. 1, the lever 240 pushes up pin 242 thus rotating upwardly the cassette holder. When the cassette holder is brought to the horizontal position shown in FIG. 1 the ejection lever 244 disengages from the upper end of the stop member 246 so that the ejection lever 244 is rotated in the counterclockwise direction to eject the cassette out of the cassette holder 203, thus terminating playing back of the magnetic tape. The ejected cassette can be reinserted into the cassette holder after insertion or may be replaced by a new one. As shown in FIG. 2, a microswitch 250 acting as a source switch is mounted near the inner end of the cassette holder. In the not playing back state described above the operating member 251 of the source switch 250 is disengaged from one side of the cassette holder so that the apparatus is disconnected from the source, not shown.

An L shaped stop member 252 is secured to the inner side of the front panel 201 for holding the cassette holder 203 in the horizontal position.

The cassette loading mechanism thus far described operates as follows. When cassette 210 is inserted into the cassette holder 203 through a cassette insertion opening 253 of the front panel 201 the inner edges of the cassette 210 pushes the free end of the ejection lever 244 thus rotating it in the clockwise direction. When the lever leaves the stop member 246, the cassette holder 203 rotates downwardly. This downward movement is cushioned by air cylinder 247 whereby the cassette holder can rest on the chassis calmly without producing any noise. when the cassette holder is lowered the source switch 250 is closed so that capstan 235 and the reel shafts supported by the reel supporting platforms 214 and 215 are inserted into the cassette thereby commencing playback.

As described hereinabove, since in the quiescent or not playing back state, the cassette holder 203 is maintained in the horizontal position, insertion and ejection of the cassette can be made readily through the front panel. By suitably selecting the ratio of the lengths of levers 240 and 241 it is possible to bring the cassette holder to the not playing back position.

Figure 5:
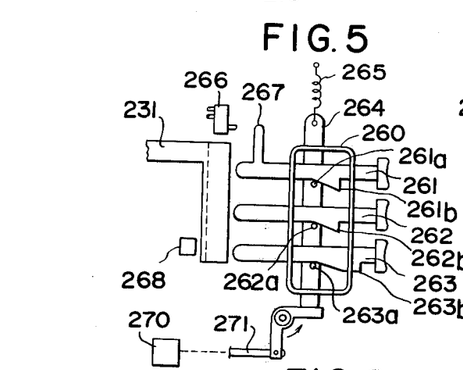
FIG. 5 shows one example of the mode switching mechanism.
Figure 6:
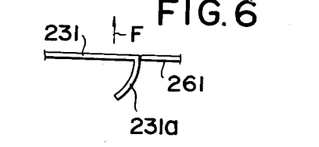
FIG. 6 is a partial view showing the operating lever and one of the push buttons shown in FIG. 5.

The mode switching mechanism for producing command signals for rapid feeding, rewinding, etc. is represented by a dotted line block D in FIG. 2. The mode switching mechanism comprises a push button mechanism as shown in FIGS. 5 and 6. More particularly, the mechanism comprises a rectangular frame 260 and a plurality of push buttons 261, 262 and 263 which are slidably supported by the frame 260 and biased toward right by means of springs, not shown. A locking bar 264 is slidably supported by the frame 260 and biased upwardly by means of a spring 265. The locking bar 264 is provided with pins 261a, 262a and 263a cooperating with respective shoulders 261b, 262b and 263b of respective push buttons. The push button mechanism is constructed such that when one of the push buttons is depressed and locked other push buttons are unlocked and reset. For example, when push button 262 is depressed it will be locked by the engagement of pin 262a and shoulder 262b. This depression moves the operating lever 231 to the left with the result that the magnetic head 230 and pinch roller 235 are separated from the magnetic tape and the capstan 205. Consequently, the magnetic tape is rapidly taken up by reel shaft 218 thus providing rapid feeding. When the push button 261 is depressed next time, the push button 261 is locked at the depressed position by the engagement of pin 261a and shoulder 261b whereas the push button 262 is unlocked and reset to the position shown in FIG. 5. As the push button 261 is depressed, the operating lever 231 is moved to the left and a microswitch 466 is actuated by a lateral projection 267 of the push button 261 thereby reversing the driving motor 211. Then the pulley 226 is rotated in the clockwise direction to take up the magnetic tape at a high speed thus performing rewinding. At this time pulley 224 is idle. Leftward movement of the control lever 231 actuates a switch 268 to disconnect the driving motor 211 from an electronic governor (not shown). As a result the motor 211 rotates at a high speed from 6 to 8 of its normal speed whereby the rewinding speed is increased further. It should be understood that the driving motor may be of any type provided that it is reversible. Since the reversal of an electronic motor can be effected by angularly displacing the position detection element by a distance corresponding to the pole width of the motor the projection 267 may be used to operate the rotor reversing device through a link mechanism in which case switch 266 is not necessary.

When push button 263 is depressed next time other push buttons 261 and 262 are reset. However, as the shoulder 263b of the push button 263 is formed closer to the outer end, the push button 263 is not locked in the depressed position. Accordingly, the operating lever 231 is reset to the right to urge the magnetic head and the pinch roller against the magnetic tape and the capstan respectively for commencing playing back. A bellcrank arm 269 is pivotally mounted on the holder of the apparatus and is biased to rotate in the counterclockwise direction to engage the one end of the locking bar 264 by means of a spring, not shown. The other arm of the bellcrank arm 269 is connected to a brake device 270 through a link 271. The brake device 270 is used to apply a braking force to the discs 219 of respective reel supporting platforms. Accordingly, when either one of the push buttons 261, 262 and 263 is depressed, locking lever 264 is moved longitudinally with the result that the brake device 270 is urged against the discs 219 thus braking the reel supporting platforms each time the mode is switched. This prevents undue tensioning or slackening of the magnetic tape. So long as the push button 263 is manually held in the depressed state, the magnetic head 230 and the pinch roller 235 are maintained away from the cassette 210. At the same time the reel shafts 218 of respective reel supporting platforms are braked to standstill, so that the magnetic tape will not be moved. For this reason, this arrangement can also be used as a pause device in which playing back or recording is temporarily interrupted.

As shown in FIG. 6, the operating lever 231 is provided with an arcuately curved downwardly extending portion 231a for the reason as follows. More particularly, during rapid feeding or rewinding operation, if the cassette holder 203 is rotated upwardly to the horizontal position by operating knob 241a, the running of the magnetic tape is stopped, and the operating lever 231 is moved upwardly as shown by arrow F and pulled to the right by spring 234 (FIG. 2).

When cassette 210 is inserted and the cassette holder 203 is rotated downwardly the curved portion 231a engage either push button 261 or 262 to move the operating lever 231 to the left thereby enabling rapid feeding or rewinding.

In the mode switching mechanism described above, depression of the push button is used to move the operating lever 231 to the left for separating the magnetic head and the pinch roller from the cassette holder. For this reason, it is necessary to apply a relatively large operating force to the push buttons and it is inevitable to produce noise. While the restoring force of the operating lever can be increased by increasing the force of spring 234 and the magnetic head can be securely held in the operative position. Further, the pinch roller is firmly urged against the capstan thus ensuring constant speed running of the magnetic tape. However, increase in the force of spring 234 requires a large mannual force operating the push buttons. In the practical designs, it is necessary to make a compromise between these contradicting conditions so that it is difficult to obtain sound recording and playing back apparatus having satisfactory characteristics.

Figure 7:
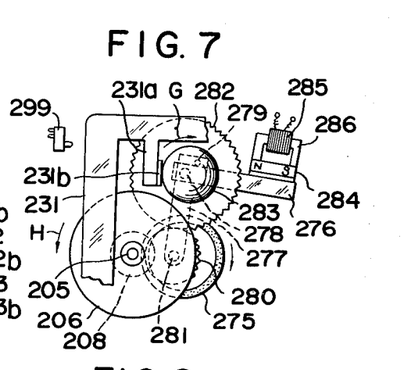
FIG. 7 is a bottom view showing an improved mode switching mechanism constructed in accordance with the teaching of this invention.

It is a feature of this invention to solve these problems. With reference now to FIG. 7, the lower end of the capstan 281 is elongated to engage and disengage an idle wheel 275. A pair of levers 276 and 277 are secured to a pin 278 secured to the subchassis 216 (FIG. 2), and the lever 276 is spring biased to urge against a pin 279 secured to lever 277. The levers 276 and 277 are biased by a spring, not shown, to rotate in the clockwise direction as shown by an arrow G. A gear 280 and an idle wheel 275 integral therewith are mounted on a pin 281 secured to the free end of the lever 277. A gear 282 and a ball shaped cam 283 integral therewith are loosely mounted on pin 278. The ball shaped cam 283 is formed eccentrically with respect to gear 282. A permanent magnet 284 is secured to the outer end of lever 276 and an electromagnet having an exciting coil 285 and a magnetic core 286 is mounted on the subchassis 216 for normally attracting the permanent magnet 284. The gear ratio of gears 282 and 280 is 2:1. As shown in FIG. 7 the operating lever 231 is provided with a parallel leg 231a which is provided with a downwardly depending projection 231b that engages the ball shaped cam 283.

When the exciting coil 285 is momentarily energized, it produces magnetic flux having a polarity opposite to that of permanent magnet 284 so that the permanenet magnet 284 is released to rotate levers 276 and 277 in the clockwise direction whereby the eccentric idle wheel 275 provided with a rubber ring around its periphery is urged against the spindle 205 to be driven thereby. When the idle wheel rotates a small angle the exciting coil 285 is deenergized so that the magnet 284 attracts again the core 286. Under these conditions, the angle between levers 276 and 277 has been decreased a smaller than that of the original position shown in 7. Thereafter the idle wheel 275 continues to rotate while levers 276 and 277 are maintained at said decreased angle. As has been pointed out hereinabove since the idle wheel 275 is eccentrically mounted on pin 281, when the idle wheel completes one revolution it disengages from capstan 205 and stops to rotate. Due to the gear ratio between gears 280 and 282, gear 282 makes one half revolution while the idle wheel makes one revolution. The ball shaped cam 283 also makes one half revolution. Since the cam 283 is eccentric with respect to pin 271 it forces the operating lever 231 to the left. Accordingly the magnetic head and the pinch roller are moved away from the cassette thereby stopping playback and the mode is switched to rapid feeding.

As the coil 285 is energized again momentarily, levers 276 and 277 are rotated in the clockwise direction and the idle wheel 275 is rotated one revolution. Then the idle wheel is stopped. At the same time the ball shaped cam 283 is rotated one half revolution to the position shown in FIG. 7 so that the operating lever 231 is pulled to the right thus urging the magnetic head and the pinch roller against the cassette. Thus the mode is switched to playing back. As the ball shaped cam 283 is rotated one half revolution in response to the first exciting signal the operating lever 231 is forced to the left against the force of spring 234 (FIG. 2), thereby increasing the load. As the flywheel 206 is rotating in the counterclockwise direction as shown by an arrow H, the gear 280 rotates in the clockwise rotation. For this reason, the force urging the idle wheel 275 against the capstan 205 increases with the load thus making more positive the power transmission. The electromagnet 285 and 286 may be substituted by a small electromagnetically operated plunger that locks the lever 276.

As can be noted from the foregoing description, each time the coil 285 is excited the magnetic head and the pinch roller are moved toward and away from the cassette.

Figure 9:
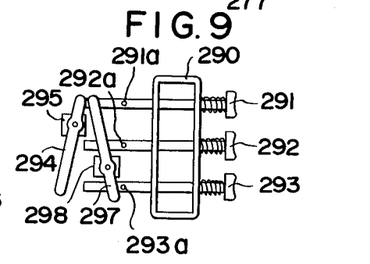
FIG. 9 shows a modified push button mechanism.
Figure 10:
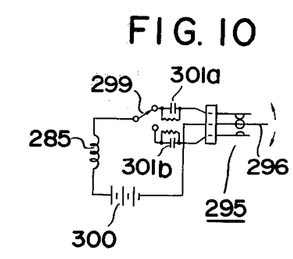
FIG. 10 is an electrical connection showing the connection of switches and the coil of an electromagnet.

In a modified push button mechanism shown in FIG. 9 three push buttons 291, 292 and 293 are slidably mounted on a stationary rectangular frame 290 for selectively engaging an operating lever 294 of a transfer switch 275. As shown in FIG. 10 the transfer switch 295 has a pair of stationary contacts and movable contact carried by an actuating lever 296 operated by the pivotal motion of the operating lever 294. Push buttons 291, 292 and 293 are provided with pins 291a, 292a and 293a, respectively for engaging a second operating lever 297 which actuates a switch 298 for reversing the driving motor 211 (FIGS. 1 and 2). When the second operating lever 297 is in the position shown in FIG. 9, the driving motor 211 rotates in the forward direction. A microswitch 299 is disposed to be operated by the operating lever 231 as shown in FIG. 7. This switch is also shown in FIG. 10 in a position corresponding to the playing back mode. When push button 292 is depressed the pin 292a rotates the second operating lever 297 in the counterclockwise direction to the position shown in FIG. 9 so that the driving motor 211 rotates in the forward direction. At the same time, the lefthand end of the push button 292 rotates the first operating lever 294 in the clockwise direction to the position shown in FIG. 9. At this time the actuating lever 296 of the transfer switch 295 is moved upwardly so that current flows momentarily through coil 285 from source 300 via a capacitor 301a. As a consequence, the ball shaped cam 283 shown in FIG. 7 rotates one half revolution to move the operating lever 231 to the left thus separating the pinch roller and the magnetic head away from the cassette. Thus, the operation is switched to rapid feeding.

When push button 293 is depressed next time, the pin 293a thereof rotates the second operating lever in the clockwise direction to operate the switch 298 for the driving motor 211 thus reversing the rotation whereof. Actuation of the push button 293 does not operate switch 295 since the first operating lever 294 has already been rotated in the clockwise direction by the actuation of the push button 292. Accordingly, rewinding is performed.

When the push button 291 is depressed, pin 291a rotates the operating lever 297 in the counterclockwise direction to rotate motor 211 in the forward direction. Furthermore the lefthand end of push button 291 rotates the operating lever 294 in the counterclockwise direction to actuate the actuating lever 296 of switch 295 to the lower side. Then the coil 285 is momentarily energized by source 300 through a capacitor 301b to rotate the ball shaped cam 283 by one half revolution thereby moving the operating lever 231 to the right. Consequently, the magnetic head and the pinch roller are urged against the cassette to commence playing back. Although transfer switch 299 is not essential but it assures more positive operation.

As can be clearly understood from the foregoing description the mode switching can be made by depressing push buttons 291, 292 and 293 with a small force. Whereby shocks and noises produced by a large electromagnet utilized in the prior art apparatus can be avoided. The push buttons are not locked but returned to the original position by springs.

The ball shaped cam 283 operates as follows. More particularly, after the cassette casing 203 has been raised to the horizontal inoperative position as shown in FIG. 1, the cassette 210 is inserted into the cassette holder and then the cassette holder is rotated downwardly. If it is assumed now that such lowering of the cassette holder were made under the rapid feeding mode, as the operating lever 231 is moved to the right while it is moved downwardly by the action of spring 234 the projection 231b of the operating lever 231 would engaged the left hand side of the ball shaped cam 283 and slip along the surface thereof.

As a result, the operating lever 231 will be moved to the left thus resuming the rapid feeding mode.

The input to the coil 285 of the electromagnet shown in FIG. 7 may be a pulse of short duration. As a consequence, push button switches 291, 292 and 293 are required to operate micro-switches 295 and 298 thus requiring an extremely small operating forces and no noise is generated.

Figure 11:
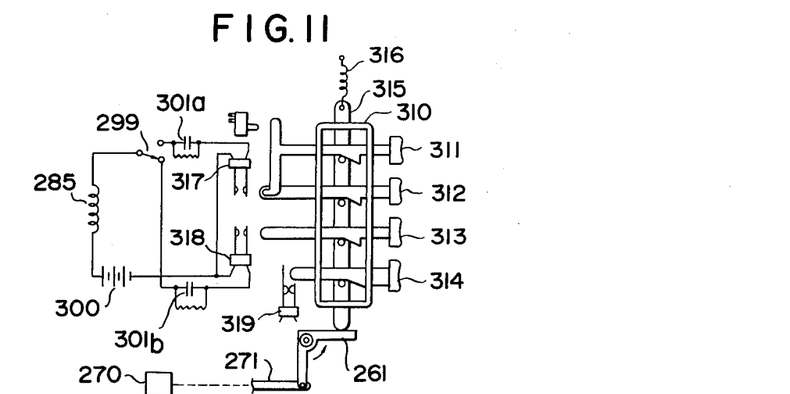
FIG. 11 shows a modified push button mechanism.

FIG. 11 shows a modified push button mechanism similar to that shown in FIG. 5. In this embodiment, four push buttons are slidably mounted on a stationary rectangular frame 310, and a locking bar 315 also slidably mounted on the frame 310. The locking bar 315 is provided with a plurality of pins cooperating with respective push buttons in the same manner as above described and biased upwardly by a spring 316. The push button mechanism is constructed such that whenever one push button is depressed and locked the other push buttons are released. Brake device 270 is operated by the locking bar 315 through bellcrank arm 261 in the same manner as in FIG. 5. Switches 317 and 318 correspond to transfer switch 295 shown in FIG. 10. Other elements are designated by the same reference numerals as in FIG. 10.

Figure 8:
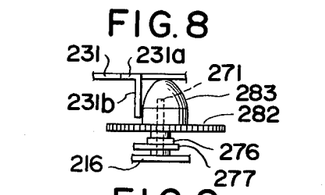
FIG. 8 is a side view showing a portion of the mode switching mechanism shown in FIG. 7.

In operation, when the push button 313 is depressed it is locked by the locking bar 315. At the same time switch 318 is closed to momentarily energize coil 285 through capacitor 301b and transfer switch 299. As a consequence, the ball shaped cam 283 is rotated one half revolution to the position shown in FIG. 8 and the magnetic head and the pinch roller are urged against the cassette thus commencing playing back.

When the push button switch 312 is depressed and locked next time, the switch 317 is closed so that the coil 285 is energized again momentarily through transfer switch 299 that has already been transferred to the upper side and capacitor 301a. Concurrently therewith push button 313 is reset to open switch 318. Accordingly, the ball shaped cam 283 rotates one half revolution to move the operating lever 231 to the left whereby the magnetic head and the pinch roller are moved away from the cassette thus commencing rapid feeding.

Then, when the push button 314 is depressed, other push buttons are released and reset. However push button 314 is constructed not to be locked by the locking bar 315. While the push button 314 is being depressed the brake device 270 is operated through bellcrank cam 261 and lever 271 to apply a braking force upon the reels thus maintaining standstill the magnetic tape. At the same time source switch 319 is opened. For this reason, it is possible to stop playing back or rapid feeding during the interval in which the push button 314 is held in the depressed condition.

Figure 12:
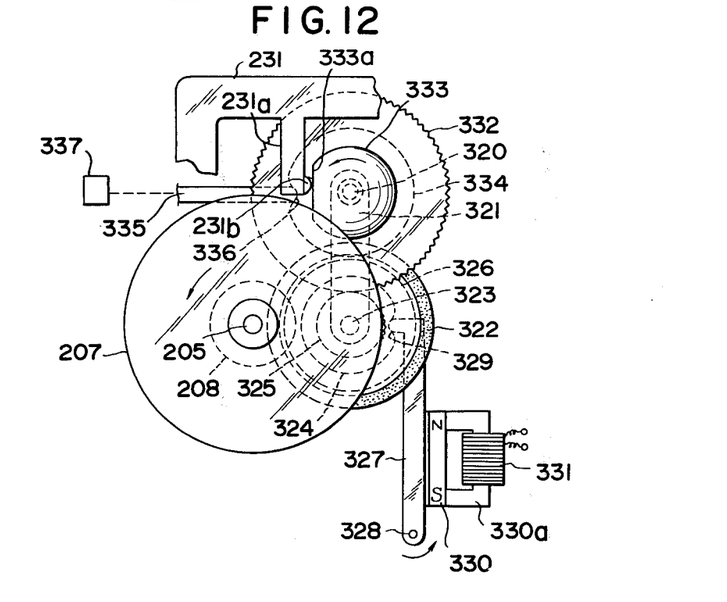
FIG. 12 shows a bottom view of a modified mode switching mechanism.

FIG. 12 shows a modified embodiment of the mode switching mechanism of this invention which comprises a shaft 320 secured to the subchassis 216 shown in FIG. 1, a lever 321 secured to the shaft 320, an idle wheel 322 mounted on the free end of lever 321 by a pin 323 and adapted to engage the lower end of the capstan 205, a rotary cam 324, and gears 325 and 326 which are formed integral with the idle wheel 322. A lever 327 is rotatably mounted on a pin 328 secured to the subchassis and urged by a spring, not shown to rotate in the counterclockwise direction so that the free end of lever 327 engage the lower portion or recess 329 of cam 324. A permanent magnet 330 is secured to the lever to attract the magnetic core 330 of an electromagnet provided with an exciting coil 331.

Shaft 320 supports a gear 332 and a spherical cam 33 formed integral therewith. Further a gear 334 is rotatably mounted on shaft 320 to mesh gear 325. The gear ratio of gears 334 and 325 is 3 : 1. Gear 334 meshes gear 326 and the gear ratio is 1 : 1. A portion of the spherical cam 333 is cut away to form a flat surface 333a to cooperate with the downwardly depending portion 231b of the operating lever 231.

In operation, when the coil is energized momentarily, lever 327 is released and rotates in the counterclockwise direction so as to engage the lower portion 329 of cam 324 with the result that the idle wheel 322 provided with a rubber ring about its periphery is urged against capstan 205. Thus, the idle wheel begins to rotate. When the coil 331 is deenergized, the free end of lever 327 disengages from the lower portion of the cam 324. However, as the free end of lever 327 still engages the high portion of cam 324, idle wheel 322 continues its rotation. When the free wheels completes one rotation, the free end of the lever 327 drops again into the lower portion of the cam so that the idle wheel 323 is moved away from the capstan 205 and stops its rotation. In this manner, each time when the coil 331 is energized the idle wheel makes one revolution in the just same manner as in the embodiment shown in FIG. 7. As the flywheel 207 is rotated continuously in the counterclockwise direction, gear 334 also rotates in the same direction. As gear 334 makes one revolution when the idle wheel 322 makes one revolution, a lever 335 operated by cam including a recess 336 and positioned behined gear 334 is reciprocated one cycle. The lefthand end of lever 335 is connected to a brake device 337 which applies a braking force to the reel shafts of the cassette. Gear 332 and the spherical cam 333 rotate 120° during one complete revolution of the idle wheel 322. Although the spherical cam 333 is not eccentric but formed with a flat surface 333a so that when the portion 231b engages the flat surface 333a, the operating lever 231 is pulled to the right to urge the magnetic head and the pinch roller against the cassette thus playing back the tape. On the other hand, when the portion 231b of the operating lever 231 engages the circular portion of the spherical cam 333, the operating lever 231 is moved to the left thus stopping playing back. Accordingly, rapid feeding or rewinding can be performed.

Figure 13:
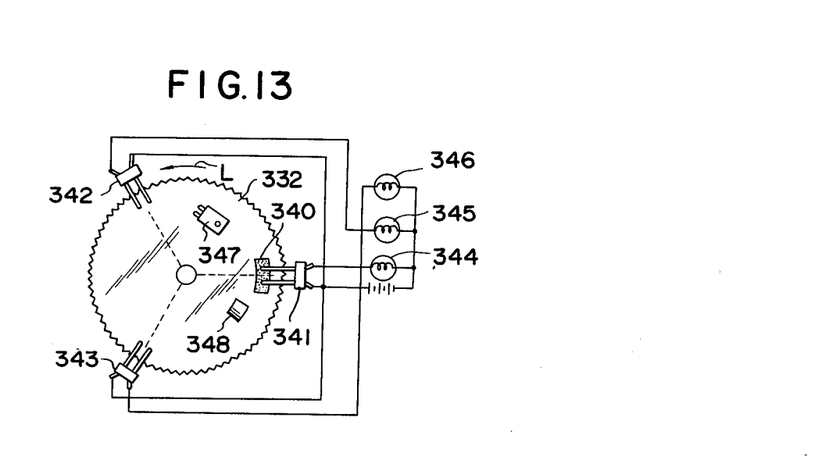
FIG. 13 shows an electrical circuit for lighting lamps which display the modes of operation.

As shown in FIG. 13 the gear 332 constitutes a rotary switch. Thus, a conductive piece 340 insulatively mounted on gear 332 successively closes contact pairs 341, 342 and 343 as the gear 322 rotates, thereby successively lighting lamps 344, 345 and 346. Beneath the gear 332 is mounted a microswitch 347 to be operated by an actuator 348 mounted on the lower side of the gear 322.

Figure 14:
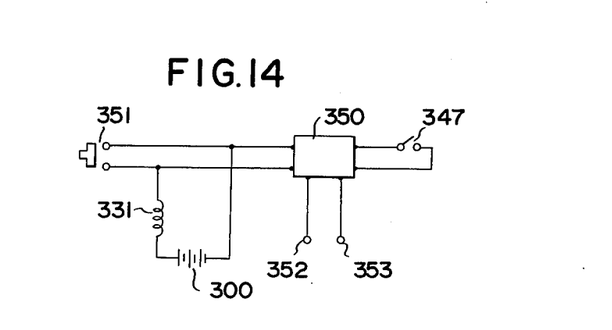
FIG. 14 is connection diagram of a control circuit for the mode switching mechanism shown in FIG. 12.

FIG. 14 shows a control circuit for the mode switching mechanism described above. The control circuit comprises a flip-flop circuit 350. When a push button 351 is depressed, exciting coil 331 shown in FIG. 12 is momentarily energized to rotate the idle wheel 322 one revolution. At the same time a signal is applied to input terminals of the flip-flop circuit 350 to produce an output on the terminal 352. This output is used to rotate the driving motor 211 in the forward direction. As a result, gear 332 rotates 120° and the conductor 340 closes contact pair 342 to light lamp 345. Immediately prior to the stopping of gear 332 microswitch 347 is operated by projection 348 so that an input signal is applied to the righthand input of the flip-flop circuit 350. The state of the flip-flop circuit is inverted to produce an output on the output terminal 353 which is used to reverse the driving motor 211. Also since the spherical cam 333 is rotated 120°, the operating lever 231 is moved to the left for separating the magnetic head and the pinch roller away from the cassette, thereby rewinding the magnetic tape. As the operating lever 231 is moved to the left microswitch 268 (see FIG. 5) is operated to disconnect the driving motor 211 from an electronic governor (not shown) for increasing the speed of the driving motor. Thus the rewinding is performed at a higher speed. Furthermore, as the gear 334 shown in FIG. 112 also rotates one complete revolution brake device 337 is operated through lever 335 to brake the reel shafts of the cassette. In this manner a braking force is applied to the reel shafts while the mode is being switched, thereby effectively controlling the running of the magnetic tape. Lighting of lamp 345 displays rewinding operation.

When push button 351 (FIG. 14) is depressed the coil 331 of the electromagnet is energized so that the idle wheel 322 makes one revolution. Accordingly gear 332 rotates 120° and gear 334 makes one revolution. Again the running of the magnetic tape is stopped during mode switching, and the conductor 340 closes contact pair 343 to light lamp 346. At the same time an input is applied to the lefthand input terminals of the flip-flop circuit 350 so that it produces an output on the output terminal 352 and rotation of the motor 211 is reversed to the forward rotation. Although the spherical cam 33 is rotated 120°, the operating lever 231 is maintained in the same position. Accordingly, the tape is run at a high speed and the lighted lamp 346 displays this condition. Upon depression of push button 351, the coil 331 of the electromagnet is energized to rotate idle wheel 322 one revolution, gear 332 120° and gear one revolution. Again the reel shafts are braked during mode switching by the brake device 337 thus stopping the running of the magnetic tape. Further, the spherical cam 333 rotates 120° to return to the position shown in FIG. 12 at which the projection 231b of the operating lever 231 engages the flat portion 333a of cam. Consequently, the operating lever 231 is moved to the right to urge the magnetic head and the pinch roller to the cassette thus commencing to reproduce. The conductor 340 closes contact pair 341 to light lamp 334 which displays playing back.

As described hereinabove, each time the push button 351 is depressed momentarily, mode switching is performed cyclically through playing back, rewinding and rapid feeding. Moreover, as the power necessary to perform the mode switching is taken from the driving system for driving the capstan and since no large electromagnet or plunger is used for driving the mode switching mechanism as in the prior art construction it is possible to effect mode switching softly and positively without producing any noise. As the push button can be located at any desired position the mode switching mechanism can be controlled from a remote position through a wired or wireless remote control system.

Figure 15:
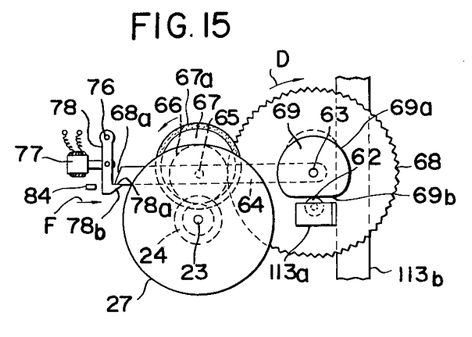
FIG. 15 is a plan view of another embodiment of the mode switching mechanism of this invention.
Figure 16:
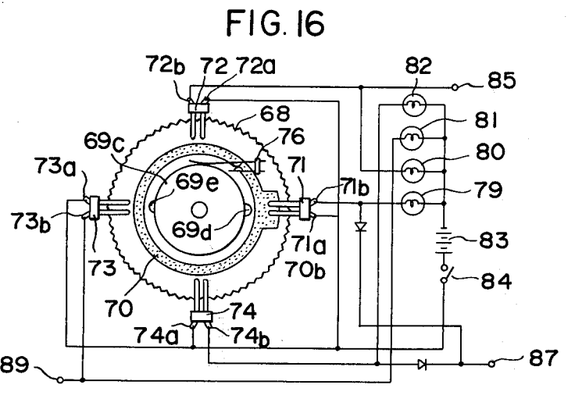
FIG. 16 is a bottom view showing certain elements of the mode switching mechanism shown in FIG. 15.

FIGS. 15 and 16 show a modified mode switching mechanism of this invention. As shown in FIG. 15, a shaft 63 is located at a position remote from a capstan 23 (corresponding to capstan 205 shown in FIGS. 1 and 2) in a space between chassis 200 and subchassis 216 (FIG. 1) for rotatably supporting a lever 64 within the subchassis. A shaft 65 is provided at about the center of lever 64 for rotatably supporting a gear 66 and an eccentric disc 67 which is integral with the gear 66 and having a diamter larger than that of the gear 66 so that the gear is contained within the periphery of the eccentric disc 67. The periphery of the eccentric disc 67 is surrounded by a rubber ring 67a. The lever 64 is urged toward the capstan by means of a biasing spring, not shown. A gear 68 made of insulating material and having teeth of the number 4 times of that of the teeth of the gear 66 meshing therewith is loosely mounted on shaft 63.

A cam 69 concentric with the gear 68 is formed integral therewith. The cam 69 is provided with an arcuate periphery 69a extending for an angle of 270° about the center and a flat portion 69b with its opposite ends connected to the arcuate periphery 69a through arcuate surfaces of small radius. A roller 62 carried by a projection of the operating lever 113b (corresponding to the operating lever 231 shown in previous figures) is normally urged against the peripheral surface of the cam 69 by the spring biasing force applied to the operating lever. As shown in FIG. 16 the cam 69 is provided with a circular disc portion 69c projecting beneath the gear 68. The circular disc portion 69c is provided with radial projections 69d and 69e on both ends of a diameter extending in parallel with flat portion 69h of the cam 69.

As shown in FIG. 15, a conductor ring 70 is secured to the lower surface of the gear 68 in concentric therewith and the ring 70 is provided with a radial projection 70b on a portion of its periphery. The projection 70b is located 90° apart from the center of the flat portion 69b of cam 69.

A pair of electric contact 71 is mounted on the upper surface of the subchassis 216 at such position that the contacts are engaged by the projection 70b of the conductor ring 70 when the center of the flat portion 69b of cam 69 comes to oppose the roller 62. Further, contact pairs 72, 73 and 74 are mounted on the upper surface of the subchassis at positions 90°, 180° and 270°, respectively, from the contact pair 71 so as to be successively engaged by the projection 70b of the conductor ring 70. A normal close switch 76 having its operating member engaged against the periphery 69c of the cam 69 is also mounted on the subchassis at the same angular position as the second contact pair 72 (in FIG. 16, the switch 76 is shown as being displaced from the contact pair 72).

The electrical connection of these contact pairs and the switch will be described later with reference to FIG. 18. The purpose of the switch 76 is to disconnect an electronic governor, not shown, from the driving motor 211. The motor 211 is designed such that when it is disconnected from the electronic governer, the motor will rotate at a speed of 4 times of the speed when the electronic governor is connected to the motor.

Referring again to FIG. 15, a locking lever 78 operated by the plunger of a solenoid coil energized in a manner to be described later is provided to lock the free end of the lever 64. The lever 78 is pivotally mounted at 78 and urged against lever 76 in the direction of arrow F by a spring, not shown.

One contacts 71a through 74a of respective contact pairs 71, 72, 73 and 74 are connected to the positive pole of a DC source 83 for lighting indicating lamps 79, 80, 81 and 82, respectively, through a normal close switch 84 which is opened only when the locking lever 78 is retracted from the free end of lever 64. The other contacts 71b through 74b of the contact pairs are connected to the opposite terminals of respective lamps 79 through 82. The contact 72b of the second contact pair 72 is connected to terminal 85 which is connected to the input terminal 86 of the control circuit shown in FIG. 18, whereas output contact 87 is connected to contacts 71b and 74b of the first and fourth contact pairs 71 and 74 and is connected to the other input terminal 88 of the control circuit. The output contact 89 connected to the contact 73b of the third contact pair 73 is connected to another input terminal 90 of the control circuit.

Figure 17:
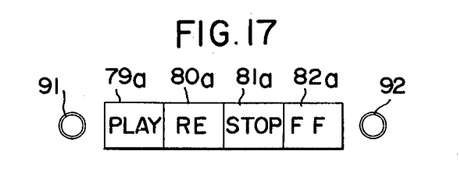
FIG. 17 is a front view of the operating buttons of the mode switching mechanism.

FIG. 17 shows an arrangement of various control switches which are mounted on the front panel of the sound recording and playing back apparatus, not shown. The first and second control switches 91 and 92 are maintained in the closed condition so long as they are depressed and mounted on the control panel with a spacing therebetween. The indicating lamps 79 through 82 are mounted between control switches 91 and 92. Respective lamps are covered by display covers 79a through 82a which are labelled with letters PLAY, RE, STOP and FF, respectively.

Figure 18:
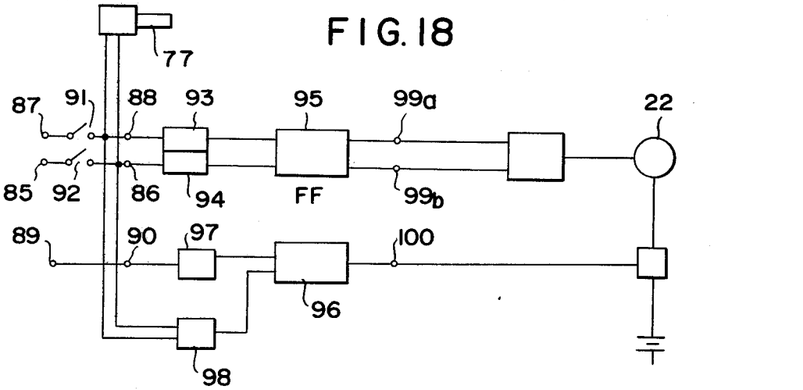
FIG. 18 is a block diagram of the motor control circuit utilized in the mode switching mechanism shown in FIGS. 15 and 16.

The control circuit for the driving motor shown in FIG. 18 comprises a flip-flop circuit 95 connected to receiver differentiated pulses from differentiating circuits 93 and 94 when the control switches 91 and 92 are operated. The input terminals of the differentiating circuits 93 and 94 are connected to the input terminals 88 and 86 of the control circuits. Another input terminal 90 of the control circuit is connected to one input terminal of a second flip-flop circuit 96 through a differentiating circuit 97. The signals produced by the operations of the control switches 91 and 92 are also applied to the coil for operating plunger and to a differentiating circuit 98 connected to the other input terminal of the second flip-flop circuit 96.

The first flip-flop circuit is constructed such that it produces an output on its output terminal 99a when it receives the output from the differentiating circuit 93 and that it produces an output on the other output terminal 99b when it receives the output from the second differentiating circuit 94. The output on the output terminal 99a is used to drive the driving motor 211 in the forward direction through a relay or an electronic switch, not shown, whereas the output on the output terminal 99b is used to drive the driving motor in the reverse direction.

The output terminal 100 of the second flip-flop circuit 96 is connected to an electronic switch, not shown, for connecting the driving motor 211 to the source of supply.

The modified embodiment shown in FIGS. 15 to 18 operates as follows. Upon insertion of a cassette 210 into the cassette holder (FIG. 2) the cassette holder is rotated downwardly, whereas it is moved upwardly by the operation of the knob 241a as has been described in connection with FIG. 1. The embodiment shown in FIGS. 15 to 18 is different from the sound recording and playing back apparatus shown in FIGS. 1 to 5 in the manner of switching the modes. More particularly, FIGS. 15 and 16 shows a condition of reproducing the magnetic tape. Under these conditions, the center of the flat portion 69b of the cam 69 engages roller 62 of the operating member 113a and the free end of the lever 64 is engaged by the locking lever 78 so that the periphery of the eccentric wheel 67 is separated from the capstan 23. Under these conditions since the operating lever 113 is pulled by spring 234 to approach to the side surface of the cassette holder 203, the pinch roller 235 enters unto the casette holder through a window in said side surface, not shown, to clamp the magnetic tape between the pinch roller 235 and the capstan 23 and the magnetic head 230 is held close to the magnetic tape. Further, the projection 70b of the conductor ring 70 is secured to the lower surface of the gear 68 closes contact pair 71, thereby lighting lamp 79 which illuminates display cover 79a labelled with the letter PLAY. The output produced on the contact 71b at this time is impressed upon the control circuit shown in FIG. 18 via terminals 87 and 88 thus driving the motor 211 in the forward direction. As a consequence, the tape is driven in the forward direction for effecting playing back.

To switch the mode from playing back to rewinding, switch 91 is operated. Operation of this switch causes energization of the coil for operating the plunger 77 with the result that the locking lever 78 is disengaged from the free end of lever 64 against the bias of the spring. Then the lever 64 rotates toward capstan 23 to urge the rubber ring 67a of the eccentric wheel 67 against the capstan 23. At this time switch 91 is released whereby the coil for operating plunger 77 is deenergized. The eccentric wheel 67 is driven by the capstan 23 and rotates one revolution. During this one revolution, the lever 64 is forced by the eccentric wheel 67 to reciprocate one cycle about the center of capstan 23. As the coil of the plunger 77 has been deenergized, the locking lever 78 is freed. The hook 78a of the locking lever 78 is maintained in the path of movement of the free end of the lever 64 by the biasing spring. However, as the lower end of the hook is inclined as at 78b and since the free end of the lever 64 is also inclined in the same direction as at 68a, clockwise rotation of lever 64 as viewed in FIG. 115 will not be prevented. When the eccentric wheel 67 completes one revolution the free end of the lever 64 is again locked by the hook 78a of the locking lever thus maintaining the eccentric wheel 67 away from the capstan 23 and the rotation of the eccentric wheel is stopped. Thus, the eccentric wheel makes one complete revolution. During this rotation of the eccentric wheel the gear 68 and the cam 69 integral therewith make ¼ rotation. This rotation causes roller 62 to ride on the arcuate surface 69a of cam 69 for moving the operating lever 113 away from the side surface of the cassette holder. Consequently, the pinch roller 235 and the magnetic head (FIG. 2) are separated away from the cassette holder thus freeing the magnetic tape in the cassette. The projection 70b of the conductor ring 70 secured to the lower side of the gear 68 closes the contact pair 72 whereby lamp 90 is lighted and an output is produced at the output terminal 85. Lighting of lamp 80 illuminates display cover 80a labelled with RE. At this time, the high portion 69a of cam 69 opens the normal close switch 76 thus disconnecting the driving motor 211 from the electronic governor. The output appearing at the terminal 85 is applied to the input terminal 86 of the control circuit so that flip-flop circuit 95 inverts its state thereby producing an output on its output terminal 99b. Consequently, the driving motor 211 is driven in the reverse direction at a speed 4 times of the normal speed for rewinding the magnetic tape.

To stop the apparatus, the switch 91 is depressed again. Then the state of the flip-flop circuit 95 is inverted again thus driving the driving motor 211 in the forward direction. At the same time, the coil of the plunger 77 is energized again for an interval in which the switch 91 is maintained depressed, whereby the eccentric wheel 67 makes one revolution in the same manner as above described. Immediately after commencement of this one revolution the projection of cam 69 disengages from switch 76 to close the same. Then the driving motor 211 is reconnected to the electronic governor to run at the normal speed. Before the eccentric wheel 67 completes one revolution the cam 69 rotates 90° so that the projection 70b of the conductor ring 70 closes the contact pair 73. As a result, lamp 81 is lighted to illuminate display cover 81a labelled with STOP.

The output produced by contact 73b is applied to the control circuit through terminals 89 and 90 for inverting the state of the second flip-flop circuit 96 thereby removing the output on the output terminal 100. Thus, the driving motor 211 is stopped. At this time, the roller 62 of the operating member 113a engages the high portion 69a of cam 69 so that the pinch roller and the magnetic head are maintained remote from the side surface of the cassette holder in the same manner as in the case of rewinding.

To change the mode from this mode to the rapid feeding mode, switch 91 is to be operated again. Then, in the same manner as above described, the cam 69 is rotated 90°, thus closing the fourth contact pair 76 by the projection 70b of the conductor ring 70. Furthermore, the projection 69a of cam 69 opens switch 76 thus disconnecting the driving motor 211 from the electronic governor. Closure of the contact pair 74 lights lamp 82 thus illuminating display cover 82a labelled with FF. Under these conditions, since the magnetic tape is not clamped between the pinch roller and the capstan and since the driving motor 211 has been disconnected from the electronic governor, the motor rotates in the forward direction at a speed of four times of the normal speed thus producing rapid feeding.

At this time when the switch 91 is operated again, cam 69 is rotated further by 90° in the same manner as above described to resume the condition shown in FIG. 15, thus assuming the reproducing mode.

As has been described above according to this invention, it is possible not only to switch the modes sequentially through PLAY, RE, STOP and FF modes but also to directly switch the mode from reproducing mode to rapid or fast feeding mode. The latter switching can be made by continuously depressing the switch 91 for causing the eccentric wheel 67 to make two revolutions and then releasing switch 91 when the display cover 80a is illuminated by lamp 80. Thereafter, the mode can be switched to the rapid feeding mode just in the same manner as the switching of from the stop to the rapid feeding mode. In this case, however, at the end of the first complete revolution of the eccentric wheel 67, the projection 70b of the conductor ring 70 closes the contact pair 72. Then, a motor reversing signal would otherwise be produced at the terminal 85 but since the normal close switch 84 connected in series with the lighting source 83 is opened by the retraction of the locking lever 78, such signal would not be produced by the closure of the contact pair 72 thus preventing reversal of the driving motor during mode switching.

To switch the mode from stop to reproducing mode, the switch 92 is depressed until the eccentric wheel 67 completes one revolution. The depression of switch 72 inverts the state of the first flip-flop circuit 95 thus producing an output on its output terminal 99b which reverses the rotation of the driving motor 211 thus rotating the capstan 23 and the eccentric wheel 67 in the reverse direction. As a consequence the cam returns to the rewinding mode from the stop mode.

At this time, contact pair 72 is closed by the projection 70b of the conductor ring 70 thus illuminating display cover 80a labelled with RE by lamp 80 and the output produced at the output terminal 85 converts the control circuit to the reverse running condition. At this time switch 92 is released. Then, the eccentric wheel 67 and the cam 69 continue to rotate in the direction mentioned above even after the release of the switch 92 until they are stopped at the position of reproducing mode thus resuming the condition shown in FIG. 15. It is believed unnecessary to describe again the recording mode since it is identical to that of the first embodiment. Further, although not shown in FIGS. 15 and 16, a brake device similar to that shown in FIG. 11 is used for braking the reel supporting platforms at the time of switching the move. Such brake device can also be controlled by a switch closed by the retraction of the locking lever 78 through a CR time constant circuit or an one shot multivibrator circuit which operates the brake device for a definite interval, as will be described later.

In this manner, according to the embodiment shown in FIGS. 15 to 18 it is also possible to effect mode switching by using the driving power of the capstan. Moreover, the construction and operation of the mode switching mechanism are simple because it is necessary to provide only two control switches 91 and 92.

Figure 19:
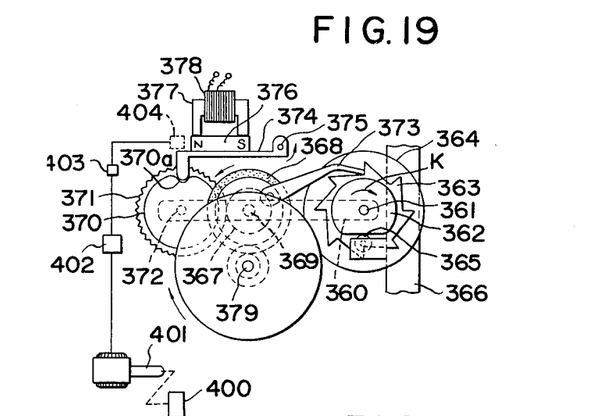
FIG. 19 shows a plan view of the mechanism.
Figure 20:
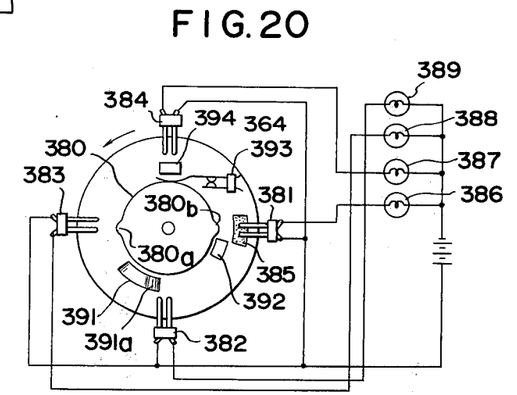
FIG. 20 shows a bottom view of the disc utilized in the mechanism shown in FIG. 19 and indicating lamps and various switches controlled by the disc.
Figure 21:
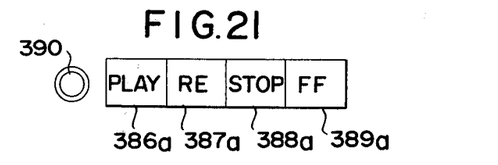
FIG. 21 is a diagram showing an arrangement of a control push button and display covers.

In another embodiment of the mode switching mechanism shown in FIGS. 19, 20 and 21, a lever 360 is secured to shaft 361 secured to the subchassis 216 (FIG. 1) and is biased in the clockwise direction by means of a spring, not shown, in the clockwise direction, as shown by arrow K. A rotary cam 362, a ratchet wheel 363 and a circular disc 364 which are constructed intrgrally are rotatably mounted on shaft 361. Cam 362 has a construction identical to cam 69 shown in FIG. 15 and engages a roller 365 supported by the operating lever 366 corresponding to the operating lever 231 shown in FIG. 2. Integrally constructed gear 367 and an idle wheel 368 are rotatably mounted on a pin 369 secured to lever 360, and integrally constructed cam 370 and a gear 371 are rotatably mounted on a pin 372 at the free end of lever 360. The gear 371 meshes gear 364 with a gear ratio of 2 : 1. A pawl 373 for operating the ratchet wheel 363 is pivotally connected to the idle wheel 368. An L shaped locking lever 374 is pivotally mounted on the subchassis at 375 and is biased in the counterclockwise direction by a spring, not shown. A permanent magnet 376 is secured to the lever 374 to cooperate with the magnetic core 377 of an electromagnet provided with an energizing coil 378. When the coil 378 is energized momentarily, the magnetic flux produced thereby opposes the flux generated by the permanent magnet 376 so that the free end of the lever 374 drops into the lower portion 370a of the cam 370 thereby rotating lever 360 in the counterclockwise direction. As a consequence, the idle wheel 368 is urged against capstan 379 (corresponding to capstan 205 shown in FIG. 2). When the idle wheel 368 completes one revolution, pawl 373 advances the ratchet wheel 363 by one tooth. When the idle wheel makes additional one revolution, the ratched wheel is advanced another one tooth. During this interval, as the free end of the lever 374 is urged against the high portion of the cam 370, the idle wheel 368 is more firmly urged against the capstan this providing more positive power transmission. To this end it is advantageous to secure the magnetic core 377 to the subchassis by a relativey strong leaf spring, not shown. When the idle wheel 368 makes two revolutions as above described, the free end of the lever 374 again drops into the low portion 370a of cam 370 so that the lever 360 is slightly rotated in the clockwise direction thereby disengaging the idle wheel from the capstan thus automatically interrupting transmission of power. Until this time the ratchet wheel 363 has rotated 90°. Thus, each time the coil 378 is energized momentarily, ratchet wheel 363, cam 362 and disc 364 are rotated 90°. Further, whether the free wheel 368 rotates in one or other direction, the ratchet wheel, cam and disc are rotated 90° in the same direction.

FIG. 20 shows a bottom view of the disc 364 made of plastic or any ther insulating material. A cam 380 having two dimetrically opposite radial projections 380a and 380b is made integral with the disc 364. Four electrical contacts 381, 382, 383 and 384 which are mounted about the disc 364 at a spacing of 90° are arranged to be closed by a conductor segment 385 secured to disc 364. The contacts 381, 382, 383 and 384 are connected to lamps 386, 387, 388 and 389 respectively to illuminate display covers 386a, 387a, 388a and 389a respectively labelled with PLA (playing back), RE (rewinding), STOP (stop) and FF (rapid feeding). These display covers and a control push button 390 for energizing coil 378 of the electromagnet are mounted on the front panel of the sound recorcing and playing back apparatus.

This embodiment operates as follows. Since roller 365 engages the projection of the operating lever 366, playing back can be made in the same manner as described hereinabove. Upon depression of the push button 390 locking lever 374 is released to urge the free wheel 368 against the capstan 379 thus rotating ratchet wheel 363 and disc 364 by 90° in the clockwise direction. Consequently, contact pair 384 is closed by conductor segment 385 to light lamp 387 whereby the display cover 387 labelled with RE is illuminated. At the same time projection 391 of the disc 364 closes a microswitch 392 mounted on the stationary part of the apparatus and acting as the reversing switch of the driving motor 211. Consequently, the rotation of the motor 211 is reversed. Furthermore, a microswitch 393 is opened by the projection 380b of cam 380 for disconnecting the motor 211 from an electronic governor, not shown. Accordingly, the speed of the driving motor is increased to four times of its normal speed. Under these conditions roller 365 engages the circular portion of cam 360 so that the operating lever 366 is moved downwardly to separate the magnetic head and the pinch roller away from the magnetic tape and the capstan respectively. In this manner, the mode is switched to rewinding mode which is displayed by the display cover 387a.

When the push button 390 is depressed again momentarily, the idle wheel 365 stops after two revolutions. At this time, although the driving motor 211 rotates in the opposite direction, the ratchet wheel 363 and the disc 364 are rotated 45° in the same direction as before. At this time, as the projection 391 disengages microswitch 392, the driving motor 211 now rotates in the forward direction. As a consequence, the ratchet wheel 363 is rotated over additional 45° and then stopped. Now the contact pair 383 is closed by the conductor segment 385 to light lamp 388 thus illuminating display cover labelled with STOP. The magnetic head and the pinch roller are maintained in their positions remote from the cassette. Further microswitch 394 acting as the source switch is operated by the projection 391 so that all electric apparatus such as the driving motor, amplifier, not shown, etc. are disconnected from the source of supply, thus switching the mode to the stop mode. It should be understood that the projection 391 has a high portion 391a and that the microswitch 394 is depressed to be operated only by this high portion. Although not shown in the drawing a switch is interlocked with the push button 390 for short circuiting microswitch 394. As a consequence, the apparatus is connected temporarily to the source. Thus the driving motor 211 rotates to start rotation of the disc 364. As the high portion 391a leaves the microswitch 394, the apparatus is connected to the source and the disc 364 is stopped after a rotation of 90°. Under these conditions, the magnetic tape and the pinch roller are still maintained in the separated positions away from the cassette and the switch 393 is opened by the projection 380a so that the driving motor 211 is disconnected from the electronic governor and rotates in the forward direction at a high speed. In this manner the mode is switched in fast feeding. At this time, the contact pair 382 is closed by the conductor segment 385 to light lamp 389 thereby illuminating the display cover 387a labelled with FF. When the push button 390 is depressed again, the disc 364 is rotated 90° so that the contact pair 381 is closed by the conductor segment 385 to light lamp 386. Thus, the display cover 386a labelled with PLAY is illuminated displaying that the mode has now been switched to the playing back mode. At this time the driving motor 211 is connected to the electronic governor to operate at the normal speed and the roller 365 engages the projection of the operating lever 366 with the result that the magnetic head and the pinch roller are urged against the cassette to commence playing back. The operation of this embodiment is more simple and accurate because only one control push button 390 is necessary. Thus, by sequential operation of this push button, the mode is switched through a cycle including playing back, rewinding, stop and rapid feeding in the same manner as the embodiment shown in FIGS. 15 to 18.

To prevent undue tensioning and slackening of the magnetic tape during the running thereof and during the mode switching, a brake device 400 for applying braking force to the reel shafts is provided which is actuated by a switch 404 operated by locking lever 374 through a monostable circuit 403, an amplifier 402 and an electromagnetically operated plunger. The monostable circuit 403 operates the brake device 400 for an internal slightly longer the time required for completing the mode switching. Thus, the magnetic tape is held standstill during mode switching. Instead of utilizing the electromagnetically operated plunger 401, amplifier 402 and monostable circuit 403, the brake device 400 may be directly operated by the swinging motion of the lever 374 such that the brake is applied when the lever 374 is rotated in the counterclockwise direction.

Figure 22:
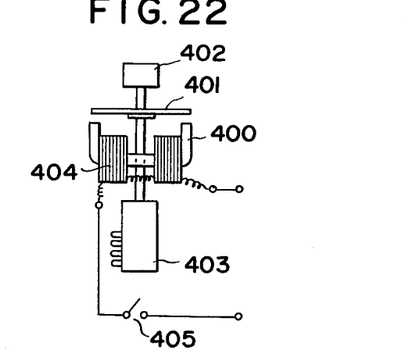
FIG. 22 show a side view of a recording push button.
Figure 23:
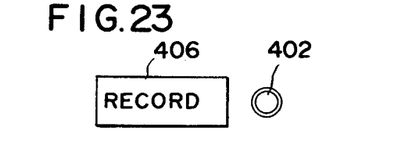
FIG. 23 shows a portion of the front panel including a display cover labelled with RECORD and a recording push button.

The recording operation will now be described with reference to FIG. 22. As shown, a U shaped magnetic core 400 is provided to attract an armature 401 operated by a push button 402 which is also used to actuate a transfer switch 403 utilized to switch the operating mode between recording and playing back. The core 400 is provided with an exciting coil 404 connected in parallel with the lamp 386 shown in FIG. 20 or lamp 79 shown in FIG. 16 which are connected to be lighted during the playing back of the magnetic tape, so that the coil is energized when the mode is switched to the playing back mode and the lamp 386 or 79 is lighted. A switch 405 is connected in series with the coil 404. Although not shown in the drawing, the switch 405 is arranged such that it is opened when its actuating member is received in an opening provided at one side rewinding cassette. This opening is closed when it is not suitable for recording. Thus, the switch 405 prevents an erroneous recording operation. As shown in FIG. 23 a display cover 406 labelled with a word RECORD is provided for the front panel adjacent the push button 402.

At the time of depressing the push button if the apparatus is set to the playing back mode said opening of the cassette is closed so that the actuating member of switch 405 can not enter into the opening to open switch 405. As a consequence, during playing back the coil 404 is energized to attract the armature 401 whereby the push button 402 will be maintained in the depressed position, and the transfer switch 403 will be maintained in the recording condition. However, when said opening for preventing erroneous recording is not closed, switch 405 is opened and hence coil 404 will not be energized. For this reason, even when the push button 402 is depressed it will not be maintained in the depressed condition. As soon as the operating force is removed the push button is reset to the position shown in FIG. 22 by a spring not shown, thus preventing the mode from being switched to the recording mode. For this reason, there is no fear of erasing the record recorded on the magnetic tape. Further, during the rapid feeding or regrinding mode even when the push button 402 is depressed it will not be maintained in the depressed condition because coil 404 is not energized. In this manner, there is no fear of switching to the recording mode with the accompanying erasure of the recod or an erroneous recording. The lap utilized to illuminate the display cover 406 is operated by the switch 403, so that it is lighted only when the apparatus is set to the recording mode.

As can be noted from the foregoing description by the use of the erroneous recording preventing means, and by the energization of the coil 404 in parallel with a lamp which is lighted at the time of playing back it is possible to efficiently prevent erroneous recording and erroneous erasure.

Where a chromium magnetic tape is used it is necessary to vary the bias current. Such switching of the bias current can readily be made by providing an opening to the rear side of a cassette containing a chromium magnetic tape and a microswitch disposed to be operated by such opening.

Although, the invention has been described as applied to a household stereo set it will be clear that the invention is also applicable to cassette decks.

It should be understood that the invention is not limited to the specific embodiments illustrated and that many changes and modifications will be obvious to one skilled in the art without departing from the true spirit and scope of the invention as defined in the appended claims.

What is claimed is:
1. In magnetic sound recording and playing back apparatus of the type comprising a cassette holder adapted to receive a cassette containing a magnetic tape, and operating lever carrying a magnetic head and a pinch roller, a capstan, means for driving said capstan, means for moving said operating lever so as to move said magnetic head and said pinch roller toward and away from said magnetic tape and said capstan respectively, and a mode switching mechanism, the improvement wherein said mode switching mechanism comprises driving means for said operating lever for selectively performing playing back, rewinding, stop and rapid feeding, and coupling means for operating said driving means from the means for driving said capstan wherein said driving means and said coupling means comprises an idle wheel, means for normally holding said capstan, a reduction gearing for reducing the speed of said idle wheel at a predetermined ratio, means responsive to an electric signal for urging said idle wheel against said capstan thus driving the idle wheel, means for disengaging said idle wheel from said capstan for stopping said idle wheel when it makes one revolution, and a rotary cam driven by said reduction gearing and disposed to drive said operating lever.

2. In magnetic sound recording and playing back apparatus of the type comprising a cassette holder adapted to receive a cassette containing a magnetic tape, an operating lever carrying a magnetic head and a pinch roller, a capstan, means for driving said capstan, means for moving said operating lever so as to move said magnetic head and said pinch roller toward and away from said magnetic tape and said capstan respectively, and a mode switching mechanism, the improvement wherein said mode switching mechanism comprises a pair of levers pivotally mounted on a stationary pin at its ends thereof, biasing means to urge said levers to rotate about said pin in a predetermined direction, a first gear and an idle wheel integral therewith and rotatably mounted on the other end of one of said levers, said idle wheel being eccentric with respect to said first gear and positioned near the capstan, a second gear meshing said first gear and an eccentric cam which are rotatably mounted on said stationary pin, said eccentric cam engaging and disengaging said operating lever when it is rotated by said first and second gears, a permanent magnet secured to the other end of the other lever, an electromagnet including a magnetic core disposed to be normally attracted by said permanent magnet and an exciting coil whereby when said exciting coil is energized said biasing means rotates said levers in said predetermined direction for engaging said idle wheel against said capstan so as to actuate said operating lever by said eccentric cam.

3. The apparatus according to claim 2 wherein said first and second gear has a gear ratio of 1 : 2.

4. The apparatus according to claim 2 which further comprises spring means for maintaining said levers at a predetermined angular relationship.

5. The apparatus according to claim 2 which further comprises a push button mechanism including a plurality of push buttons for switching the operating mode of the sound recording and playing back apparatus, a first switch connected in series with the exciting coil of said electromagnet and disposed to be operated by the movement of said operating lever, a second switch operated by said push button mechanism for reversing the driving motor of said capstan, and a transfer switch operated by said push button mechanism, said first switch including a movable contact connected to one side of said exciting coil and a pair of stationary contacts, and said transfer switch including a movable contact connected to the other side of said exciting coil through a source of supply and a pair of stationary contacts respectively connected to the stationary contacts of said first switch respectively through a pair of capacitors.

6. The magnetic sound recording and playing back apparatus according to claim 5 wherein said push button mechanism comprises a rectangular frame, a plurality of push buttons slidably mounted on said rectangular frame for actuating the operating lever of said transfer switch, and pins mounted on respective push buttons for actuating the operating lever of said second switch.

7. The magnetic sound recording and playing back apparatus according to claim 2 which further comprises a push button mechanism including a rectangular frame, first to fourth push buttons slidably mounted on said rectangular frame, a locking bar, a biasing spring for urging said locking bar in a given direction, and pins provided for said locking bar, said first to third push buttons being provided with shoulders cooperating with said pins such that when either one of said first to third push buttons is depressed said one push button is locked at the depressed position which other push buttons are released; a brake device operated by said locking bar fo applying a braking force to the reels contained in the cassette; a transfer switch operated by said operating lever and including a movable contact connected to one side of said exciting coil and a pair of stationary contacts; a pair of switches operated by the second and third push buttons and respectively connected to the stationary contacts of said transfer switch through capacitors, and a source switch operated by said fourth push button switch.

8. In magnetic sound recording and playing back apparatus of the type comprising a cassette holder adapted to receive a cassette containing a magnetic tape, an operating lever carrying a magnetic head and pinch roller, a capstan, means for driving said capstan, means for moving said operating lever so as to move said magnetic head and said pinch roller toward and away from said magnetic tape and said capstan respectively, and a mode switching mechanism, the improvement wherein said mode switching mechanism comprises a stationary shaft, a first lever rotatably mounted on said shaft at one end, an idle wheel a first cam having high and low portions and first and second gears which are rotatably mounted on the other end of said lever, a second lever pivotally mounted on the stationary member of the apparatus, spring means for biasing said second lever to engage said first cam, a permanent magnet secured to said second lever, an electromagnet having a magnetic core normally attracted by said permanent magnet and an exciting coil which when energized releases said magnetic core from said permanent magnet, a third gear meshing said first gear a fourth gear meshing said second gear and a second cam having a circular portion and a flat portion and arranged to actuate said operating lever, said third and fourth gears and said second cam being formed integrally and rotatably mounted on said stationary shaft whereby when said exciting coil is energized said idle wheel is urged against the capstan thus actuating said operating lever through said gears and cams.

9. The magnetic recording and playing back apparatus according to claim 8 wherein the gear ratio of said first and third gears is 1 : 3 and that of said second and fourth gear is 1 : 1.

10. The magnetic recording and playing back apparatus according to claim 8 wherein said mode switching apparatus further comprises a third cam integral with said second cam and a brake device operated by said third cam for applying a breaking force upon the shaft reels in said cassette.

11. The magnetic recording and playing back apparatus according to claim 8 which further comprises a plurality of lamps for displaying respective moes of the operation of the sound recording and playing back apparatus, and a plurality of switches for respective lamps and means carried by said third gear for sequentially closing said switches.

12. In magnetic sound recording and plagying back apparatus of the type comprising a cassette holder adapted to receive a cassette containing a magnetic tape, an operating lever carrying a magnetic head and a pinch roller, a capstan, means for driving said capstan, means for moving said operating lever so as to move said magnetic head and said pinch roller toward and away from said magnetic tape and said capstan respectively, and a mode switching mechanism, the improvement said mode switching mechanism comprises a stationary shaft, a lever, a first gear and a cam integral therewith which are rotatably mounted on said shaft, said cam having an arcuate portion and a flat portion and cooperating with said operating lever, a second gear meshing said first gear and an eccentric wheel which are rotatably mounted on said lever, means for biasing said lever for urging said eccentric wheel against said capstan, an electrically operated locking lever for normally locking said lever at a position in which said eccentric wheel is disengaged from said capstan, whereby when said locking lever is disengaged from said lever, said eccentric disc is urged against said capstan so as to actuate said operating lever by said cam.

13. The apparatus according to claim 12 which further comprises a plurality of display lamps for displaying the mode of operation of said magnetic recording and playing back apparatus, a plurality of switches for controlling said lamps and means carried by said first gear for sequentially operating said switches.

14. The apparatus according to claim 13 wherein said cam is provided with a pair of projections on the opposite sides of a diameter parallel with said flat portion for operating a switch which is used to connect and disconnect the driving motor of the apparatus from an electronic governor.

15. The magnetic recording and playing back apparatus according to claim 12 wherein said mode switching mechanism further comprises a control circuit including a first flip-flop circuit for reversing the driving motor of said apparatus, a pair of control switches for switching the operating mode of the apparatus, a pair of differentiating circuits respectively connected between said control switches and the input terminals of said flip-flop circuit, connections between said control switches and the operating coil of said electromagnetically operated locking member, a second flip-flop circuit adapted to disconnect said driving motor from a source, a pair of differentiating circuits respectively connected between said control switches and the input terminals of said second flip-flop circuit.

16. The apparatus according to claim 15 wherein said first gear is provided with a plurality of switches for lighting lamps for displaying the operating mode of the apparatus and means are provided for connecting said switches to said first and second flip-flop circuits through said differentiating circuits.

17. In magnetic sound recording and playing back apparatus of the type comprising a cassette holder adapted to receive a cassette containing a magnetic tape, on operating lever carrying a magnetic head and a pinch roller, a capstan, means for driving said capstan, means for moving said operating lever so as to move said magnetic head and said pinch roller toward and away from said magnetic tape and said capstan respectively, and a mode switching mechanism, the improvement wherein said mode switching mechanism comprises a shaft supported by the stationary portion of the apparatus, a lever with one end secured to said shaft, a first cam, a ratchet wheel and a circular disc which are formed integrally and rotatably mounted on said shaft, said first cam having a flat portion and a circular portion and disposed to actuate said operating lever, a first gear and an idle wheel which are formed integrally and rotatably mounted on said lever, means for urging said lever for urging said idle wheel for actuating said ratchet wheel, a second cam having a recess and a second gear meshing said first gear, said second cam and said second gear being formed integrally and rotatably mounted on said lever, a locking lever urged to engage said second cam, a permanent magnet secured to said locking lever, and an electromagnet having an exciting coil and a magnetic core normally attracted by said permanent magnet whereby when said exciting coil is energized, said locking lever is disengaged from said second cam thus urging said idle wheel against the capstan so as to operate said operating lever through said rachet wheel and said first cam.

18. The magnetic recording and playing back apparatus according to claim 17 which further comprises a plurality of lamps for displaying the modes of operation of said apparatus and a plurality of switches operated by said circular disc for lighting said lamps.

19. The apparatus according to claim 18, which further comprises a third cam integral with said circular disc, and a switch operated by said third cam for reversing the driving motor of the apparatus.

20. The magnetic recording and playing back apparatus according to claim 17 which further comprises a brake device which applies a breaking force to the reels in the cassette, and a swicth operated by said locking lever for actuating said brake device.

21. The apparatus according to claim 20 which further comprises a monostable circuit connected between the switch operated by said locking bar and said brake device, said monostable circuit operating said brake device for an internal slightly longer than the time required for completing the mode switching.

* * * * *